United States Patent
Deole et al.

(10) Patent No.: US 11,502,863 B2
(45) Date of Patent: Nov. 15, 2022

(54) AUTOMATIC CORRECTION OF ERRONEOUS AUDIO SETTING

(71) Applicant: Avaya Management L.P., Santa Clara, CA (US)

(72) Inventors: Pushkar Yashavant Deole, Pune (IN); Sandesh Chopdekar, Pune (IN); Navin Daga, Silapathar (IN)

(73) Assignee: Avaya Management L.P., Santa Clara, CA (US)

( * ) Notice: Subject to any disclaimer, the term of this patent is extended or adjusted under 35 U.S.C. 154(b) by 17 days.

(21) Appl. No.: 16/877,059

(22) Filed: May 18, 2020

(65) Prior Publication Data

US 2021/0359872 A1 Nov. 18, 2021

(51) Int. Cl.
| | |
|---|---|
| *H04L 12/18* | (2006.01) |
| *H04R 3/04* | (2006.01) |
| *G06F 9/54* | (2006.01) |
| *H04L 65/403* | (2022.01) |
| *H04L 65/75* | (2022.01) |

(52) U.S. Cl.
CPC .......... *H04L 12/1822* (2013.01); *G06F 9/542* (2013.01); *H04L 65/403* (2013.01); *H04L 65/75* (2022.05); *H04R 3/04* (2013.01); *H04R 2430/01* (2013.01)

(58) Field of Classification Search
CPC . H04L 12/1822; H04L 65/403; H04L 65/601; G06F 9/542
USPC ........................................................ 709/204
See application file for complete search history.

(56) References Cited

U.S. PATENT DOCUMENTS

| | | | |
|---|---|---|---|
| 9,247,204 B1 | 1/2016 | Yin et al. | |
| 10,412,228 B1 | 9/2019 | Haus et al. | |
| 2001/0003173 A1* | 6/2001 | Lim ........................ | G10L 15/20 704/239 |
| 2004/0047461 A1* | 3/2004 | Weisman .............. | H04M 3/567 379/202.01 |
| 2004/0179694 A1* | 9/2004 | Alley ....................... | H03G 3/32 381/55 |
| 2005/0288930 A1* | 12/2005 | Shaw ...................... | G10L 15/26 704/257 |

(Continued)

FOREIGN PATENT DOCUMENTS

EP 1406244 B1 * 10/2006 ............. G10L 25/78

OTHER PUBLICATIONS

Shawn T., Muting Yourself and Participants in Webex, Dec. 9, 2018, University of Wisconsin Knowledgebase, https://kb.wisc.edu/webex/page.php?id=88326 (Year: 2018).*

(Continued)

*Primary Examiner* — Zi Ye
(74) *Attorney, Agent, or Firm* — Sheridan Ross P.C.

(57) ABSTRACT

Electronic conferences can often be the source of frustration and wasted resources as participants may be forced to contend with extraneous sounds, such as conversations not intended for the conference, provided by an endpoint that should be muted. Similarly, participants may speak with the intention of providing their speech to the conference but speak while their associated endpoint is muted. As a result, the conference may be awkward and lack a productive flow while erroneously muted or non-muted endpoints are addressed. By detecting erroneous audio settings, endpoints can be prompted or automatically corrected to have the appropriate audio state.

18 Claims, 7 Drawing Sheets

(56) References Cited

U.S. PATENT DOCUMENTS

| | | | | |
|---|---|---|---|---|
| 2014/0247319 A1* | 9/2014 | Anderson | ................ | H04N 7/15 |
| | | | | 348/14.08 |
| 2014/0379351 A1 | 12/2014 | Raniwala | | |
| 2015/0156598 A1 | 6/2015 | Sun et al. | | |
| 2020/0110572 A1* | 4/2020 | Lenke | ...................... | H04N 7/15 |

OTHER PUBLICATIONS ip.com, Technique for detection of a person in a conference call, to detect a user action requiring unmute/mute, and to do it automatically, Apr. 11, 2014, IP.com PAD, https://priorart.ip.com/IPCOM/000236190 (Year: 2014).*

Official Action for U.S. Appl. No. 16/998,979, dated Nov. 13, 2020 12 pages.

Notice of Allowance for U.S. Appl. No. 16/998,979, dated Mar. 22, 2021 5 pages.

* cited by examiner

AUTOMATIC CORRECTION OF ERRONEOUS AUDIO SETTING

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for audio-based communications and particularly to detecting and correcting erroneous mute settings.

BACKGROUND

It is common during a conference call to expect someone to speak and hear silence followed by, "Are you on Mute?" Sometimes it is even necessary to communicate with the would-be speakers through a different channel and let them know that they are not being heard, most likely because they are still on mute. Other participants either move on, omitting the contribution from the would-be speaker, or wait until they are unmuted. Once the speaker realizes that he was talking on mute and unmute, the speaker has to repeat anything that was said while on mute.

Conversely, moderators often need to announce, "Those who are not speaking can go on mute, please?" to avoid extraneous conversations and background noise picked up from the non-speaking participant's communication devices. The conference administrators may need to remind participants of this again and again throughout during a conference. Extraneous noises may be a distraction or make understanding the intended content impossible.

Extraneous noises and silenced speakers lead to bad experiences for conference participants. The continuity or flow of the conference is interrupted and/or desired content may be omitted.

SUMMARY

Electronic conferences or meetings, with at least two participants or groups of participants communicating via communication endpoints over a network (herein, "conference") are common in business and other settings. Unfortunately, it is also common to have a speaker talking but without realizing they're on mute, resulting in confusion and wasted time and continuity of the conference. It is also common to have extraneous noise picked up and inserted into the conference from unmuted endpoints associated with non-speaking participants.

These and other needs are addressed by the various embodiments and aspects presented herein. The embodiments provide a number of advantages depending on the particular configuration.

In one embodiment, and as a general introduction to the embodiments herein, a system is provided to recognize the fact that the speaker is speaking on mute and intelligently take action and/or a system that recognizes the fact that sound (e.g., an extraneous conversation), not relevant to the conference, is being picked up and included in the conference and similarly automatically taking action before any manual intervention is required to reduce the extraneous sound within the conference.

Certain prior art systems register a conference participant along with the endpoint terminal the participant is using to provide their speech for inclusion into the conference. This allows the server to identify that the media stream arriving at the server is from a particular participant. Such prior art systems allow participants to see a list of all the conference participants and an indicia, such as highlighting, of the currently speaking participant. Similarly, when a participant is on mute, an indicia, such as a mute symbol, may be provided in a manner associated with indicia of the participant, such as the participant's name, avatar, thumbnail, etc., to identify the participant as being muted. The embodiments provided herein go beyond the prior art systems and generally advance the state of the art.

In one embodiment, a system is provided to achieve an intelligent muting/unmuting of participants, which may be performed by a microprocessor(s) (herein, "processor") executing functions or modules, which may include one or more of:

1. Voice Characteristics Recognition module: In one embodiment, a processor executes a module responsible for capturing voice characteristics of each participant of the conference when the user is actively speaking during the conference. Participation of user in the conference can be detected when only a single user is speaking in the conference while others are listening. Additionally or alternatively, when multiple participants are talking at the same time, the individual inputs from the speaking users' endpoints may be analyzed to derive the associated voice characteristics for those speaking participants.

Voice characteristics that may be captured and quantified include, but are not limited to, one or more of: loudness (volume), pitch, range, tone, and pace. In addition to the sound characteristics of the voice, language may be characterized, such as to recognize that a speaking participant may be speaking in one language (e.g., German) but the conference is being conducted in a different language (e.g., English). As a result, detecting speech in German may be identified as non-conference content and muted, such as when a participant is speaking German to another party in the room and not English to the conference. Voice recognition may utilize voice recognition libraries from sources like Nuance and Microsoft. In another embodiment, the captured voice characteristics may be utilized to train a machine learning (ML) model.

Since the data gathering, as described above, identifies the voice characteristics of each user while he is actively participating (speaking) in the conference, this data may then be used by the subsequent modules (in the process flow) to train the ML models. To reduce false positives, filtering may be performed, such as to exclude sound outside the audible level of humans. This data is used to train the models regarding the voice characteristics of each user in conference which helps the models to accurately identify that the user is actually participating (speaking) in the conference rather than having a sidebar conversation with someone outside of the conference (e.g., a person in the same room, using a cellular phone to conduct a separate conversation, etc.).

2. Natural Language Processing module: in one embodiment, a processor executes a module used to support the voice characteristics module described in #1 above. Here, the natural language processing module will process and analyze the conversation in the conference in real time. The captured speech addressed to a specific participant in the conference is identified from spoken names of the participants captured during the conference.

Once a particular participant's name is identified, such as from use during a portion of the conference, a natural language programing (NLP) may be utilized to determine the context of the sentence in which the name is used and whether that sentence is a question addressed to the participant or references a non-participant of the conference. Apart from captured voice characteristics, this determination is further used to strengthen the fact that the participant is now actively speaking in the conference.

3. Voice Characteristics Analysis and Processing module: in one embodiment, a processor of a server executes a module to receive a stream of audio (e.g., speech) from a participant's endpoint. The stream is analyzed, preferably in real-time with previously captured data, such as from the voice characteristics and/or natural language processing.

When the participant is connected to the conference using a soft client (or web client) and uses soft/web client to mute himself/herself, the data stream is still passed to the server however the server does not broadcast the stream to other participants. Therefore, the participant may be speaking on mute, however, the server still has access to the stream of data coming from participant's endpoint/terminal.

The soft client would do a screening at its end before passing the data onto the server. The initial screening may include a check determining if the intensity of the speech is beyond certain threshold, such as an audible limit of human, and filter out audio signals that are below this limit. Signals above the limited are passed on to the conference server.

When a participant is speaking on mute, the server uses the data received from the soft client to compare it against baseline data, such as training data and/or signals from the NLP module, to determine that the participant is actively speaking in the conference but is doing so on mute.

In another embodiment, with training data and the incoming real time stream from a participant's endpoint, the ML module assigns a confidence score reflecting the confidence that the participant is actively speaking, to provide the speech to the conference, but is on mute. In response to the confidence being above a previously determined threshold, an alerting event is created and sent to the conference server, such as an alerting module (see below).

4. Participant Alerting module: in one embodiment, a processor executes a module to execute an action upon receiving the confidence score associated with an alerting event. The module can proactively take actions, based on the confidence, before or to avoid any manual intervention, including upon determining an active participant is speaking on mute:

Very low confidence score: Take no action.

Low confidence score: Trigger the presentation of a visual indicator by the participant's endpoint indicating that they are speaking on mute.

Medium: Trigger an audible announcement by the participant's endpoint that they are speaking on mute.

High: Automatically unmute the participant's audio.

When a determination is made that audio provided, while the endpoint is not on mute, is not for inclusion in the conference, the specific level of confidence may result in a particular action, including:

Very low confidence score: Take no action.

Low confidence score: Trigger the presentation of a visual and/or audible cue by the participant's endpoint indicating that they are providing audio to the conference and may need to be muted.

Medium: Trigger the presentation of a visual and/or audible announcement that they are generating noise provided to the conference and should go on mute if not participating in the conference.

High: Automatically mute the participant's endpoint.

In addition to automatically determining a threshold confidence, the participant, conference moderator, or other administrator may configure the threshold values and/or disable automatic muting/unmuting with or without announcement functions announcing or indicating the participant should manually initiate muting/unmuting their endpoint. It may be necessary or beneficial to warn participants that, when muted, their audio will be monitored, but that such monitoring is solely for the determination of whether audio provided while on mute, indicates the audio should be unmuted, or vice versa, such as in accordance with the law/legal rules imposed by the local countries/geographies in which the invention will be used.

Conference Participant registration and identification: in one embodiment, when a user joins a conference, a processor of a conferencing server or system registers the participant along with the endpoint terminal that the participant is using. This allows the server to associate the media stream (audio or audio-video) arriving at the server is from a particular participant. As described herein, at least one processor of the conference server may execute components/modules in order to determine if a participant's endpoint should be automatically unmuted or other action should be taken in response to determining that a participant is likely speaking, with intent of having the speech included in the conference, but currently muted.

The embodiments herein provide for the analyzing the participants voice characteristics using NLP/AI, which may also include machine learning, deep learning, or other machine intelligence and voice recognition techniques to make a determination that the user is not speaking in the conference, but is contributing audio (e.g., noise, extraneous speech, etc.) to the conference and automatically take appropriate action before any manual intervention is required, thus preserving the rich user experience of participants in the conference.

Other embodiments herein provide for the analyzing the participants voice characteristics using NLP/AI and voice recognition techniques to make a determination that the user is actually speaking on mute in the conference and automatically take appropriate action by the system without any manual intervention, thus preserving the rich user experience of participants in the conference. NLP or other machine intelligence may be utilized to parse a sentence spoke by one participant that addressed or referencing another participant. For example, asking a question directed to another participant (e.g., "Let's look at the document. Do you have it ready, Alice?") is a question directed to Alice and, as a result, the endpoint utilized by Alice should be responding. If not, the endpoint may be automatically unmuted. If the NLP determines the reference is not directed to another participant (e.g., "Let's look at the document shared by Alice.") then the endpoint utilized by Alice may not be expected to respond and the current mute/unmuted state left unchanged.

Various embodiments and aspects of the embodiments are disclosed, including:

In one embodiment, a conference server is disclosed, comprising: A conference server, comprising: a network interface to a network; a storage component comprising a non-transitory storage device; a processor, comprising at least one microprocessor; and wherein the processor, upon accessing machine-executable instructions, cause the processor to perform: broadcasting conference content, via the network, to each of a plurality of endpoints and wherein the conference content comprises an audio portion received from a contributing endpoint of the plurality of endpoints; determining whether the audio portion is extraneous to the conference content; and upon determining that the audio portion is extraneous to the conference content, executing a muting action to exclude the audio portion from the conference content.

In another embodiment, conference server is disclosed, comprising: a network interface to a network; a storage component comprising a non-transitory storage device; a processor, comprising at least one microprocessor; and wherein the processor, upon accessing machine-executable instructions, cause the processor to perform: broadcasting conference content, via the network, to each of a plurality of endpoints and wherein the conference content selectively comprises an audio portion received from a contributing endpoint of the plurality of endpoints; determining whether the audio portion is muted, wherein the processor receives the audio portion from the contributing endpoint and omits the audio portion from the conference content; upon determining that the audio portion is muted, determining whether the contributing endpoint is erroneously muted; when erroneously muted, executing an unmuting action to include the audio portion in the conference content.

In another embodiment, a method for correcting an erroneous audio setting is disclosed, comprising: broadcasting conference content, via a network, to each of a plurality of endpoints, wherein the conference content comprises audio content provided by one or more of the plurality of endpoints; determining whether a first audio portion, of the audio content, received from a first endpoint of the plurality of endpoints is extraneous to the conference content; and upon determining that the first audio portion is extraneous to the conference content, executing a muting action to exclude the first audio portion from the conference content.

Aspects of any one or more of the foregoing embodiments include the processor that performs executing the muting action, further comprising, signaling the contributing endpoint to cause the contributing endpoint to energize a muting prompt circuit.

Aspects of any one or more of the foregoing embodiments include the processor that further performs: accessing an audio profile of a participant, wherein in the audio profile characterizes speech provided by the participant while contributing speech to the conference content.

Aspects of any one or more of the foregoing embodiments include the processor that further performs: accessing the audio profile of the participant comprising at least one of speaking volume, pitch, range, tone, or pace of speaking; and determining whether the audio portion is extraneous to the conference content, further comprising, determining that at least one of the speaking volume, pitch, range, tone, or pace of speaking of the audio portion differs from the at least one of speaking volume, pitch, range, tone, or pace of speaking of the audio profile.

Aspects of any one or more of the foregoing embodiments include the processor that determines that the audio portion is extraneous to the conference content upon determining that at least one of the speaking volume, pitch, range, tone, or pace of speaking of the audio portion differs from the at least one of speaking volume, pitch, range, tone, or pace of speaking of the audio profile and that the difference is greater than a previously determined threshold.

Aspects of any one or more of the foregoing embodiments include, wherein the audio profile comprises at least one of the speaking volume, pitch, range, tone, or pace of speaking as sampled from the conference content that follows the participant being addressed by name by another participant associated with a different one of the plurality of endpoints.

Aspects of any one or more of the foregoing embodiments include, wherein the processor determines that the audio profile of the participant upon detecting the conference content comprises a name and, following the name, hearing speech from the participant.

Aspects of any one or more of the foregoing embodiments include wherein the processor further performs: accessing an audio profile of a participant, wherein in the audio profile characterizes speech provided by the participant with regard to a sound attribute comprising a first spoken language; and determining whether the audio portion is extraneous to the conference content, further comprising, determining if the audio portion comprises a second spoken language.

Aspects of any one or more of the foregoing embodiments include, wherein the processor further performs, causing each of the plurality of endpoints to present indicia of the muting action associated with the contributing endpoint.

Aspects of any one or more of the foregoing embodiments include, wherein the processor performs executing the unmuting action, further comprising, signaling the contributing endpoint to cause the contributing endpoint to energize an unmuting prompt circuit.

Aspects of any one or more of the foregoing embodiments include, wherein the audio portion comprises encoded sound and wherein the processor determines the contributing endpoint is erroneously muted further comprising, determining the encoded sound comprises speech.

Aspects of any one or more of the foregoing embodiments include, wherein the processor performs the determination that the contributing endpoint is erroneously muted, further comprising: upon determining the encoded sound comprises speech, accessing an audio profile of a participant, wherein in the audio profile characterizes speech provided by the participant while contributing speech to the conference content; determining whether the audio portion is extraneous to the conference content, further comprising, determining that at least one of the speaking volume, pitch, range, tone, or pace of speaking of the audio portion differs from the at least one of speaking volume, pitch, range, tone, or pace of speaking of the audio profile; and when the audio portion is determined not to be extraneous, performing the unmuting action.

Aspects of any one or more of the foregoing embodiments include, wherein the processor performs the determination that the contributing endpoint is erroneously muted, further comprising, upon determining the encoded sound comprises speech that follows the participant being addressed by name by another participant associated with a different one of the plurality of endpoints.

Aspects of any one or more of the foregoing embodiments include, wherein the muting action, further comprising, signaling the contributing endpoint to cause the contributing endpoint to energize a muting prompt circuit.

Aspects of any one or more of the foregoing embodiments further include accessing an audio profile of a participant, wherein in the audio profile characterizes speech provided by the participant while contributing speech to the conference content: accessing the audio profile of the participant comprising at least one of speaking volume, pitch, range, tone, or pace of speaking; and determining whether the audio portion is extraneous to the conference content, further comprising, determining that at least one of the speaking volume, pitch, range, tone, or pace of speaking of the audio portion differs from the at least one of speaking volume, pitch, range, tone, or pace of speaking of the audio profile and wherein the difference is greater than a previously determined threshold.

Aspects of any one or more of the foregoing embodiments include receiving a second audio portion from a second endpoint of the plurality of endpoints that is muted and, when muted, omitted from the conference content; determining whether the second endpoint is erroneously muted; and upon determining that the second endpoint is erroneously muted, executing an unmuting action to include the second audio portion in the conference content.

Aspects of any one or more of the foregoing embodiments include, wherein executing the unmuting action, further comprising, signaling the contributing endpoint to cause the contributing endpoint to energize an unmuting prompt circuit.

Aspects of any one or more of the foregoing embodiments include, wherein the determining whether the audio portion is erroneously muted, further comprises, upon determining the encoded sound comprises speech that follows the participant being addressed by name by another participant associated with a different one of the plurality of endpoints.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium that, when read by a microprocessor, cause the microprocessor to execute the instructions encoded therein.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
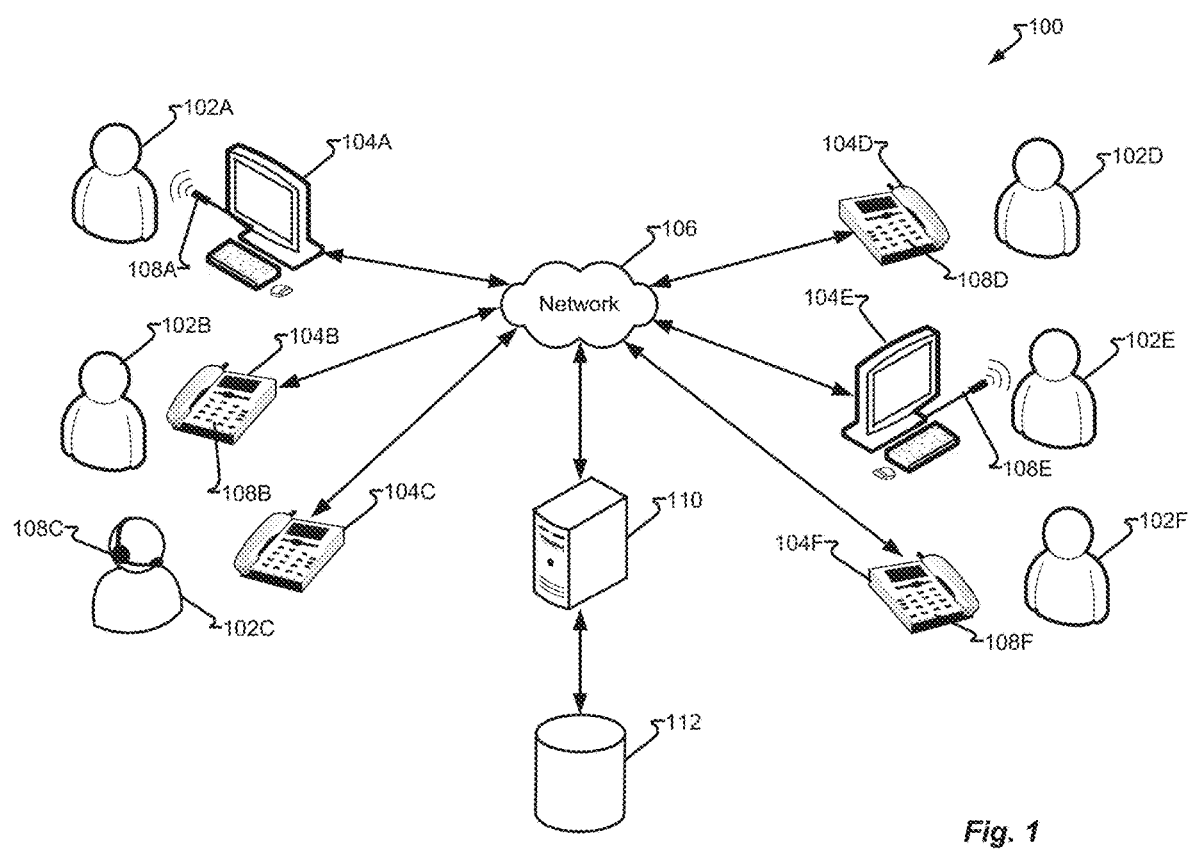
FIG. 1 depicts a first system in accordance with embodiments of the present disclosure.

FIG. 1 depicts system 100 in accordance with embodiments of the present disclosure. In one embodiment, a conference is established and maintained between participants 102 (e.g., participants 102A-F) wherein audio, and optionally video, documents, co-browsing, and/or other media, is broadcast to each participant 102. The audio portion of the conference may comprise audio in the form of speech provided by one or more of participants 102. It should be appreciated that the number of participants illustrated by participants 102 is non-limiting and may comprise any number of two or more participants, wherein at least one of participant 102 provides or attempts to provide a portion of the audio content of the conference. As will be discussed more completely with respect to the embodiments that follow, the audio content provided at any time by any of participants 102 may be extraneous to the conference and removed.

Participants 102, or at least a non-zero subset of participants 102, receive the conference as broadcast by server 110 via network 106. Server 110 may have or utilize data storage 112 as a non-transitory repository of data accessible to at least one microprocessor (or, more simply, "processor") of server 110. Server 110 may be a stand-alone component or co-embodied with other components, such as to manage communications, participant roll, timing, receiving/contributing permissions, floor control, and/or other administrative and/or connectivity features. For example, audio received by participant 102A, via endpoint 104A, is broadcast back to each endpoint 104 participating in the conference. Optionally, audio provided by one endpoint (e.g., endpoint 104A) may be excluded from the broadcast provided to the providing endpoint (e.g., endpoint 104A) for the purpose of avoiding echo, feedback, or otherwise being a distraction to participant 102A hearing their own voice, which may be subject to a delay.

Server 110 may comprise or access, telephony or other communication equipment (e.g., switches, hubs, routers, etc.) in order to facilitate broadcasting the conference and receiving portions of the conference content from any participant 102 providing conference content. In another embodiment, server 110 and/or data storage 112 may be embodied as one of endpoint 104.

Participant 102 may provide conference content via a respective endpoint 104 that converts encoded audio signals broadcasts via network 106 from server 110 and vice versa. Optionally, one or more endpoints 104 may similarly present encoded video, text messages, documents, co-browsing signals, etc. to and/or from server 110. Each endpoint 104 configured to contribute audio to the conference comprises and/or utilizes a microphone to capture mechanical wave energy (e.g., sound), such as from an associated participant 102 and converts the mechanical wave energy into electrical signals which may be further converted to data packets for transport via network 106. Examples of endpoint 104 and an associated microphone 108 include, but art not limited to, endpoints 104A and 104E each embodied as a personal computer with attached (wired or wirelessly) microphone 108A and 108E, respectively; endpoints 104B, 104D, and 104E each utilizing integrated microphone 108B, 108D, and 108E, respectively; and endpoint 104C utilizing microphone 108C incorporated into an attached (wired or wirelessly) to endpoint 104C. It should be appreciated by those of ordinary skill in the art that other microphones may be utilized as microphone 108, such as a handset of a telephone, which may be a wired (analog or digital) or wireless (e.g., cellular, WiFi, two-way radio, etc.) endpoint to network 106. Similarly, endpoint 104 may be embodied as any telecommunications device operable to receive a conference broadcast from server 110 via network 106 and present the conference to an associated participant 102 and optionally provide an audio portion for incorporation by server 110 into the conference content.

Often the difficulty of a particular technology is introduced by the humans using the technology. For example, absent a mechanical failure, automobiles would never crash if humans always performed flawlessly to perceive the automobile and the environment and respond appropriately. Similarly, conferences are often the source of frustration, wasted resources, misunderstandings, and other errors due to human mistakes. In one embodiment, a particular participant 102 may be speaking with the assumption that their speech is being included in the conference content and presented to the other participants 102. However, due to being erroneously on mute, the conference is unaware of the contribution attempted. Conversely, a particular participant 102 may be contributing sound that is extraneous to the conference but included. The sound may be speech directed to another party not engaged in the conference or other unwanted noise (e.g., background noise, tapping, humming, etc.). The particular participant 102 may mistakenly believe they are on mute or that the unwanted noise is not being picked up by the associated microphone 108 for inclusion into the conference content. As a result, other participants 102 may find it distracting or difficult to perceive the intended conference content. In the preceding examples, resources are often wasted, and the flow of the conference interrupted as participant 102 attempt to learn of the erroneous audio setting, apply a correction, and, where necessary, re-insert the intended audio content for inclusion into the conference content.

Figure 2:
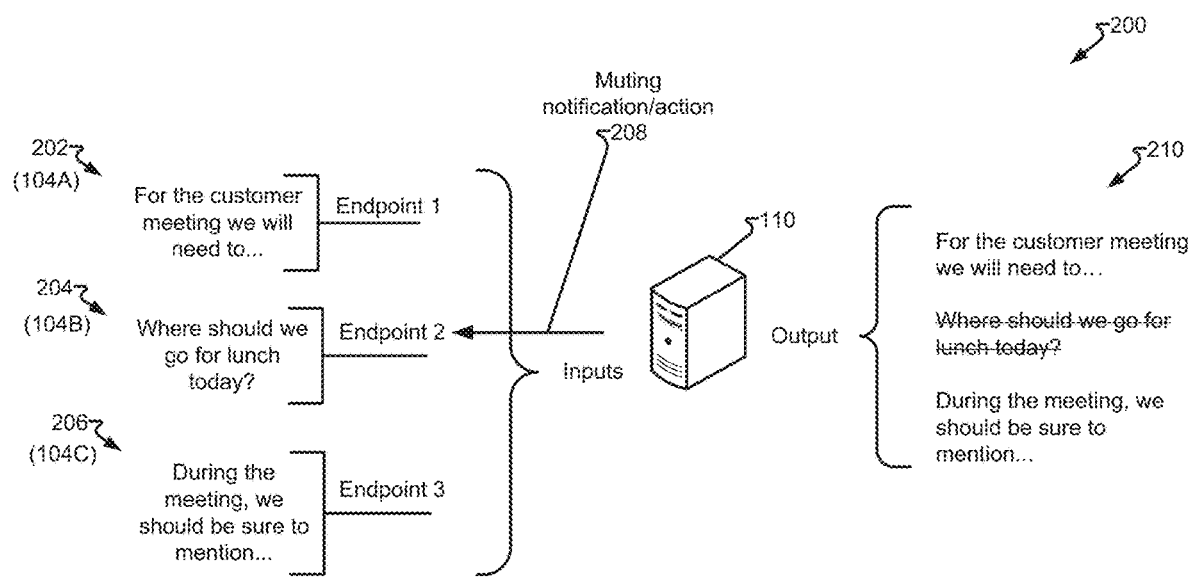
FIG. 2 depicts a first interaction in accordance with embodiments of the present disclosure.

FIG. 2 depicts interaction 200 in accordance with embodiments of the present disclosure. It should be appreciated that the nature of this paper necessitates that spoken content and other sounds, which may be embodied as sound waves or as encoded electrical signals or data packets, be represented as text. This representation using text should not be confused with actual text (e.g., text chat, Short Message Service (SMS), email, etc.). While the sending and receiving of text may be optionally be utilized and incorporated into the conference content, text-based communications are outside the scope of the embodiments provided herein. Also, each of interactions 200 and 300 (see FIG. 3) illustrate certain features and actions of system 100 and components of system 100 (see FIG. 1) and omits other features and actions to avoid unnecessarily complicating the figure and associated description.

In one embodiment, server 110 is presenting conference content 210 comprising audio content to participants 102 via their respective endpoint 104. The audio portion of the conference comprising audio contributed, continuously or intermittently, by one or more endpoint 104 and an associated or integrated microphone 108.

In one embodiment, endpoint 104A provides speech 202 to server 110 which in turn broadcast the conference content 210 now comprising the contributed speech. Similarly, endpoint 104C provides speech 206 to server 110 which in turn broadcast the conference content 210 now comprising the contributed speech. Endpoint 104B provides speech 204 to server 110. Upon server 110 determining that speech 204 is extraneous to the conference, server 110 performs a muting action to exclude speech 204 from conference content 210 (illustrated as struck-through text). The determining that sound, such as speech 204, is extraneous to the conference is discussed more completely with respect to the embodiments that follow. In one embodiment, server 110 sends muting notification/action signal 208 to endpoint 104B and, in response, endpoint 104B activates a notification circuit or logic to prompt participant 102A to manually activate a muting feature of endpoint 104B and/or automatically activate a muting feature of endpoint 104B. In one embodiment, the muting feature allows sound to continue to be captured and sent from endpoint 104B to server 110 but server 110 excludes the sound from conference content 210.

Figure 3:
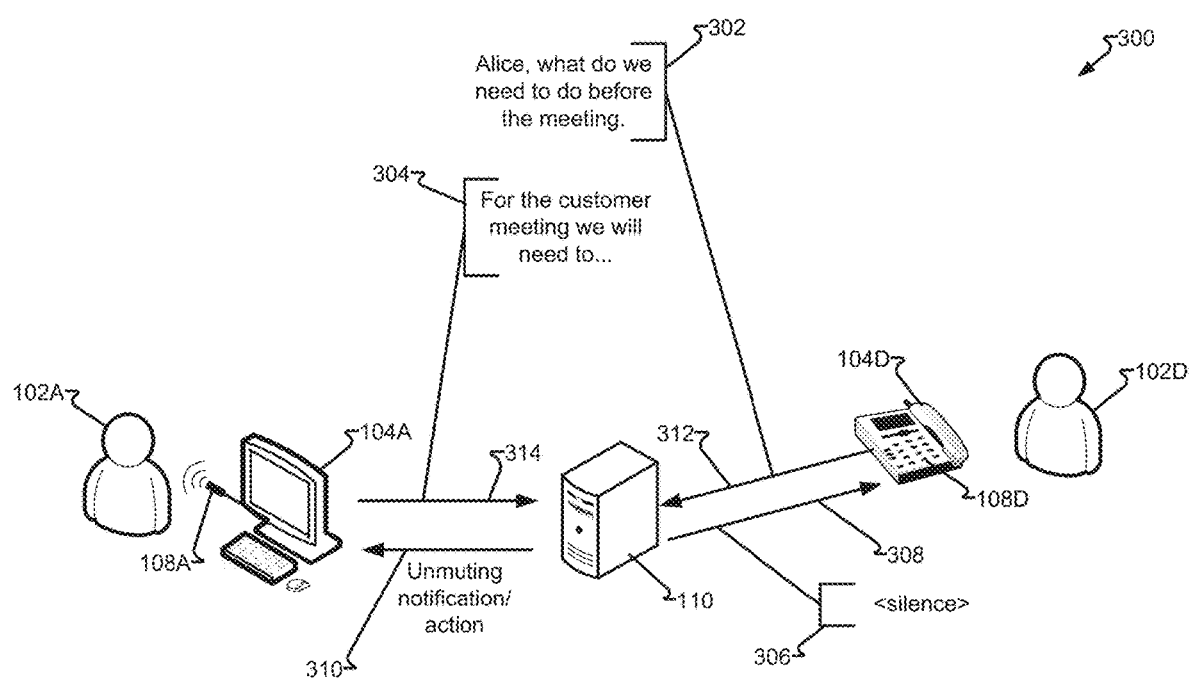
FIG. 3 depicts a second interaction in accordance with embodiments of the present disclosure.

In other embodiments, muting notification/action 208 may further include signaling endpoint 104B that they have been placed on mute and/or all endpoints 104 that endpoint 104B is on mute. As a benefit, if participant 102B is expected to provide speech to conference content, such as in response to a prompting FIG. 3 depicts interaction 300 in accordance with embodiments of the present disclosure. In one embodiment, participant 102D provides audio portion 312 comprising speech 302 to server 110, which in turn broadcasts conference content 308 to each endpoint 104, such as endpoint 104A. Participant 102A, via microphone 108A and endpoint 104A, contributes audio portion 314, such as comprising speech 304, to server 110. However, endpoint 104A is muted, by server 110 or by endpoint 104A, and speech 304 would otherwise result in conference content 308 including conference portion 306, which would be silence. To avoid having speech 304 be excluded from conference content 308 while endpoint 104A is on mute, server 110 determines that endpoint 104A is erroneously muted and, in response, executes unmuting notification/action 310 to cause speech 304 to be included into conference content 308.

In one embodiment, server 110 determines that endpoint 104A is erroneously muted due to speech 302 specifically addressing participant 102A (e.g., posing a question to "Alice"). Server 110 registers each participant 102 and their associated endpoint 104, such as by maintaining a record of participant 102 and endpoint 104 within data storage 112 (see FIG. 1). Accordingly, server 110 can perform speech-to-text analysis or other speech recognition operation and determine that particular participant 102, that is associated with endpoint 104A has a name that was provided in speech 302 ("Alice") and therefore addressed to participant 102A. As a result, speech from endpoint 104A is expected to respond to the prompt provided in speech 302 and, in response to the expected speech, muted endpoint 104A is unmuted by server 110 in unmuting/notification action 310. In another embodiment, server 110 may signal endpoint 104A, with unmuting/notification action 310, to cause endpoint 104A to execute the unmuting step when muting is performed by endpoint 104A and similarly cause speech 304 to be included into the conference content. As will be discussed in more detail with respect to the embodiments that follow, other criterion may be used when determining whether a particular endpoint 104 is erroneously muted. An NLP may be utilized to indicate that a participant is being addressed and a response is expected (e.g., "Let's look at the document and turn over to Alice." "Alice, please go over the document." "Alice, can you explain the document?" etc.) versus merely mentioning a participant (e.g., "Let's look at the document Alice provided." etc.). When a response is expected or requested, unmuting of the addressed participant may be automatically performed.

In one embodiment, unmuting notification/action 310 may comprise energizing a circuit or logic of endpoint 104A to notify participant 102A that they are on mute and/or prompt participant 102A to manually unmute endpoint 104A. For example, endpoint 104A may play a generated or recorded message or tone and/or provide a visual prompt on a display associated with endpoint 104A (e.g., "Alice, you were asked a question and you are on mute."). As a further option, endpoint 104A may replay all or a portion of speech 302. Replaying all or a portion of speech 302 re-prompts user 102A to provide a response. If user 102A did provided a response, such as while on mute, a recording may be made of response speech 304 received while on mute and replayed into the conference. For example, user 102A may begin providing speech 304, by saying a word or two (e.g., "For the . . . "), while endpoint 104A is on mute. After endpoint 104A is unmuted, server 110 may buffer the words provided after endpoint 104A is unmuted and the recorded speech followed by the buffered speech played back into the conference as conference content until speech 304 is live. If the portion of speech 304 provided during muting is more than a few words (e.g., more than ten seconds), then user 102A may be prompted to either initiate the playback the portion of speech 304 provided while on mute or repeating speech 304 again.

In another embodiments, unmuting notification/action 310 may automatically unmute endpoint 104A to provide speech 304 as a portion of the conference content. In such embodiments, unmuting notification/action 310 may further include signaling endpoint 104A wherein the signal causes a notification to be presented by only endpoint 104A, that they are off mute (e.g., tone, message, pop-up message, etc.). As a further option, all endpoints 104 may be notified of the on-mute/off-mute state of endpoints 104 and, when changed, each endpoint 104 is updated accordingly, such as with a message (e.g., "Alice is on mute" or "Alice is off mute.") or graphical icon having a meaning associated with the muting state. Optionally, speech 304 may be buffered and replayed as conference content 308, so that any speech provided before the unmuting notification/action 310 results in the unmuting of endpoint 104A, is provided as uninterrupted speech but with a delay determined by the beginning of speech 304 and the occurrence of the unmuting action. In such an embodiment, the real-time speech 304 may be buffered and only the buffered content provided as conference content 308. A subsequent pause in speech 304 may terminate the buffering and/or provide the real-time speech 304 as conference content 308, such as to provide the best experience for the conference participants.

Figure 4:
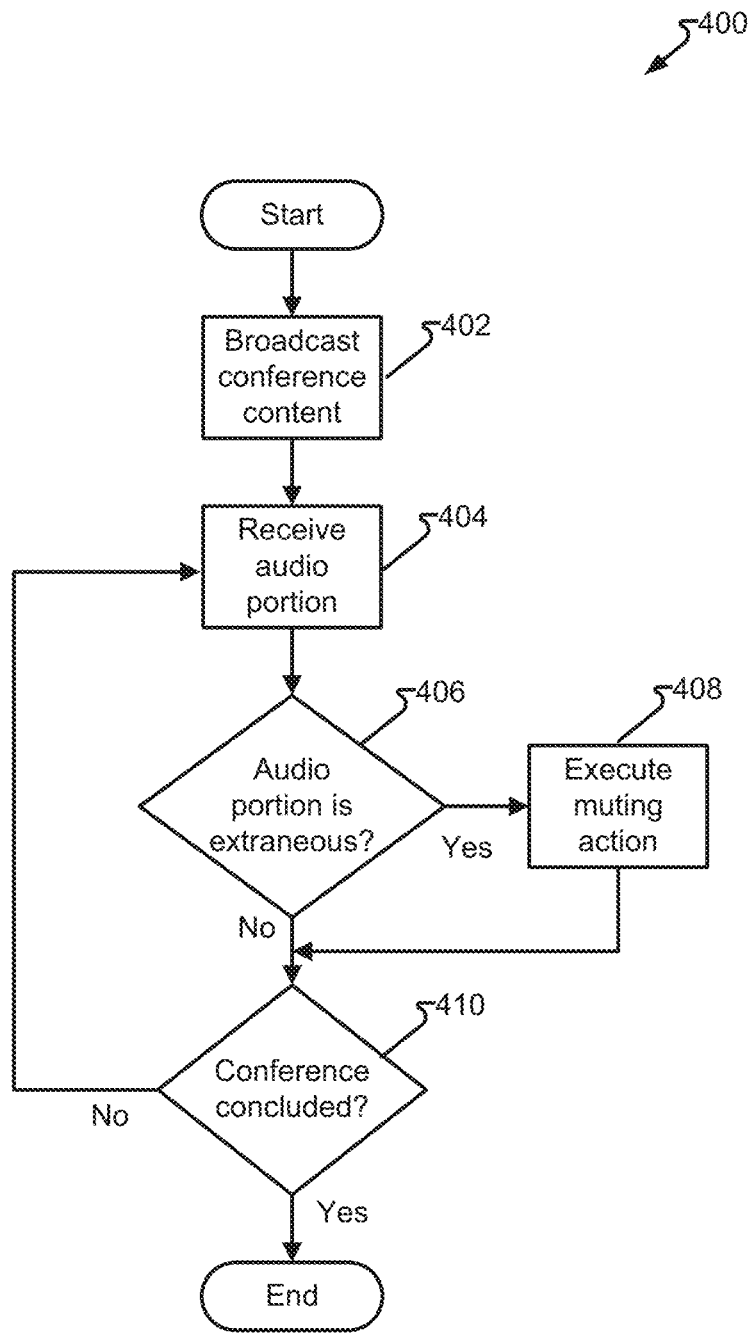
FIG. 4 depicts a first process in accordance with embodiments of the present disclosure.

FIG. 4 depicts process 400 in accordance with embodiments of the present disclosure. Process 400 may be embodied as an algorithm encoded as machine-readable instructions that, when read by a processor, such as a processor of server 110, cause the processor to execute the steps of the algorithm. In one embodiment, process 400 determines that audio being received from a particular endpoint 104 engaged in a conference is extraneous to the conference and should be excluded from the conference content.

In one embodiment, process 400 broadcasts conference content to participants in step 402, such as by server 110 broadcasting the conference content to each endpoint 104 for presentation to an associated participant 102. Step 402 initiates or continues broadcasting conference content and may be performed continuously, while other steps of process 400 are executed, until the conference is concluded. The conference content comprises audio received in step 404 from one or more individual endpoints 104. Test 406 determines if the audio received by a particular endpoint 104 is extraneous to the conference and, if determined in the negative, processing continues to test 410. If test 406 is determined in the affirmative, processing continues to step 408 wherein the audio received by the particular endpoint 104 is muted to exclude current and/or future audio received from the endpoint from being broadcasts in step 402. Muting may be performed by a processor of a server, such as server 110 providing the conference content, or by a signal to the particular endpoint 104 that, when received by the associated participants 102, performs the muting action. Test 410 determines if the conference has concluded and, if determined in the affirmative, process 400 may end and the broadcasting of the conference content initiated/continued in step 402 may be discontinued if not already terminated, otherwise processing may continue and loop back to step 404.

Test 406 is variously embodied to determine that audio received from the particular endpoint 104 is extraneous to the conference. For example, the audio received from the particular endpoint 104 may comprise non-speech sound above a certain threshold level (volume) or duration. This may include environmental noise (e.g., street, tapping of a pen, office equipment, restaurant background noise, animals, baby crying, children playing, etc.) and be excluded for not comprising speech or not comprising sufficient comprehensible speech. The audio received from the particular endpoint 104 may comprise speech but excluded from the conference content as the speech is further determined that the speech is extraneous to the conference. For example, the speech may be the din of an office setting where the speech of others forms a din of noise and the speech is partially or entirely incomprehensible. Comprehensible speech may still be determined to be extraneous to the conference and excluded from the conference content, which will be discussed more completely with respect to FIG. 6.

Figure 5:
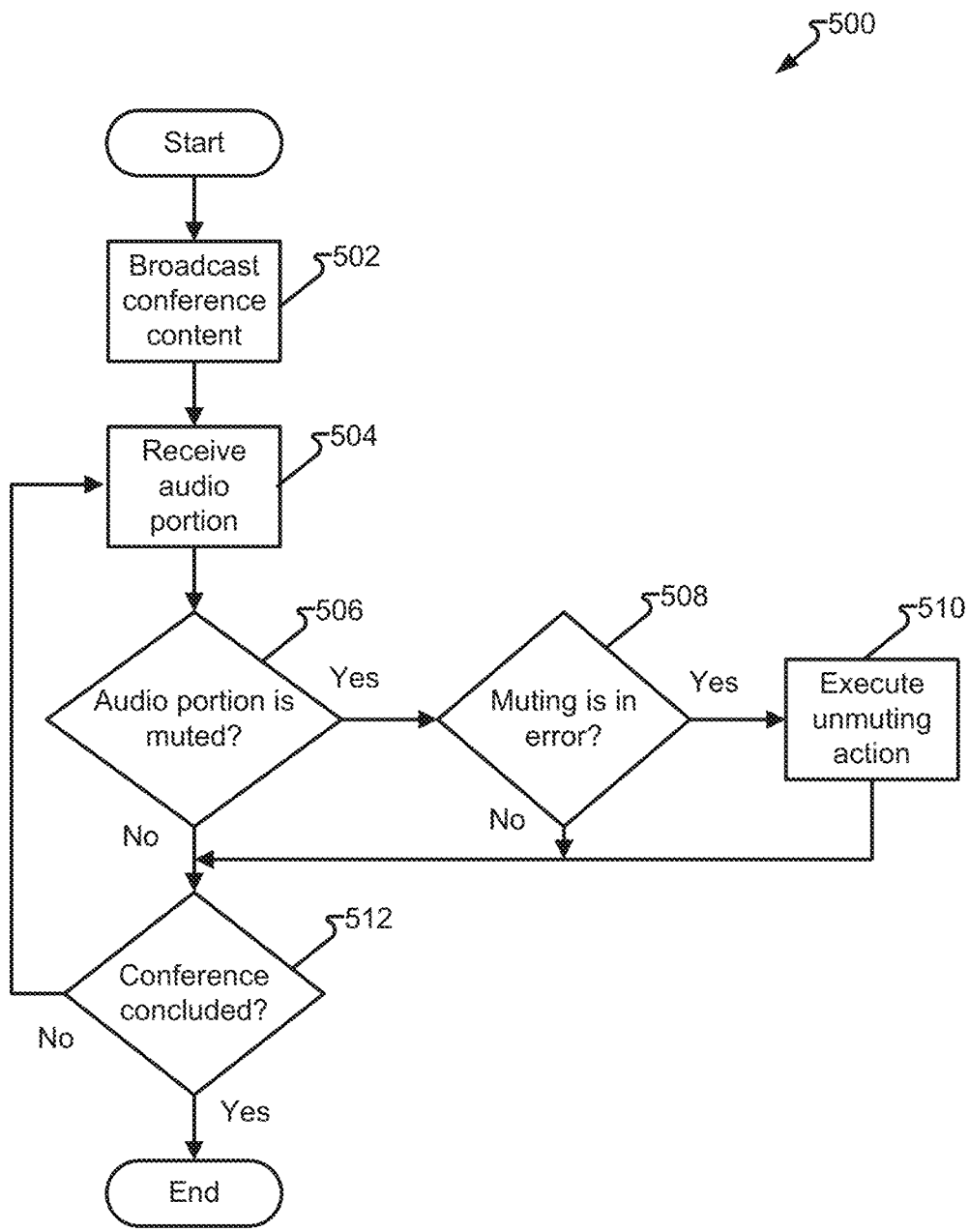
FIG. 5 depicts a second process in accordance with embodiments of the present disclosure.

FIG. 5 depicts process 500 in accordance with embodiments of the present disclosure. Process 500 may be embodied as an algorithm encoded as machine-readable instructions that, when read by a processor, such as a processor of server 110, cause the processor to execute the steps of the algorithm. In one embodiment, process 500 determines that audio being received from a particular endpoint 104 engaged in a conference is received erroneously while muted and should be included in the conference content.

In one embodiment, process 500 broadcasts conference content to participants in step 502, such as by server 110 broadcasting the conference content to each endpoint 104 for presentation to an associated participant 102. Step 502 initiates or continues broadcasting conference content and may be performed continuously, while other steps of process 500 are executed, until the conference is concluded. The conference content comprises audio received in step 504 from one or more individual endpoints 104.

Test 506 determines if the audio received from a particular endpoint 104 is received with the particular endpoint 104 is on mute. If test 506 is determined in the negative, process 500 continues to test 512 which determines if the conference has concluded. If test 512 is determine in the affirmative process 500 may end and the broadcasting of the conference content initiated/continued in step 502 may be discontinued if not already terminated, otherwise processing may continue and loop back to step 504. Test 506 may determine that the audio received by the particular endpoint 104 while on mute in response to having received a muting signal by the particular endpoint 104 and the muting thereof provided by server 110. In another embodiment, muting may be provided by the particular endpoint itself wherein server 110 receives a signal indicating that audio is being received by the particular endpoint but not forwarded to the server 110 due to being on mute.

If test 506 is determined in the affirmative, test 508 determines whether the muting is erroneous and, if determined in the affirmative, executes step 510 to execute an unmuting action. If test 508 is determined in the negative, processing may continue to test 512. Step 510 may unmute the audio received from the particular endpoint 104, such as when the muting is performed by server 110 or by sending a signal to the particular endpoint 104 to unmute and, in response, the particular endpoint unmutes.

The determination that the muting is in error performed by test 508 is variously embodied. In one embodiment, a preceding portion of the conference content, such as provided by a different endpoint 104 addressed the participant 102 associated with the particular endpoint 104, such as by name, role, location, etc. In another embodiment, an attribute of the speech provided in the audio from the particular endpoint 104 matches an attribute of speech, within a previously determined threshold, of prior speech from the participant 102 when known to be providing speech intended to be included in the conference content, which will be discussed more completely with respect to FIG. 6.

Figure 6:
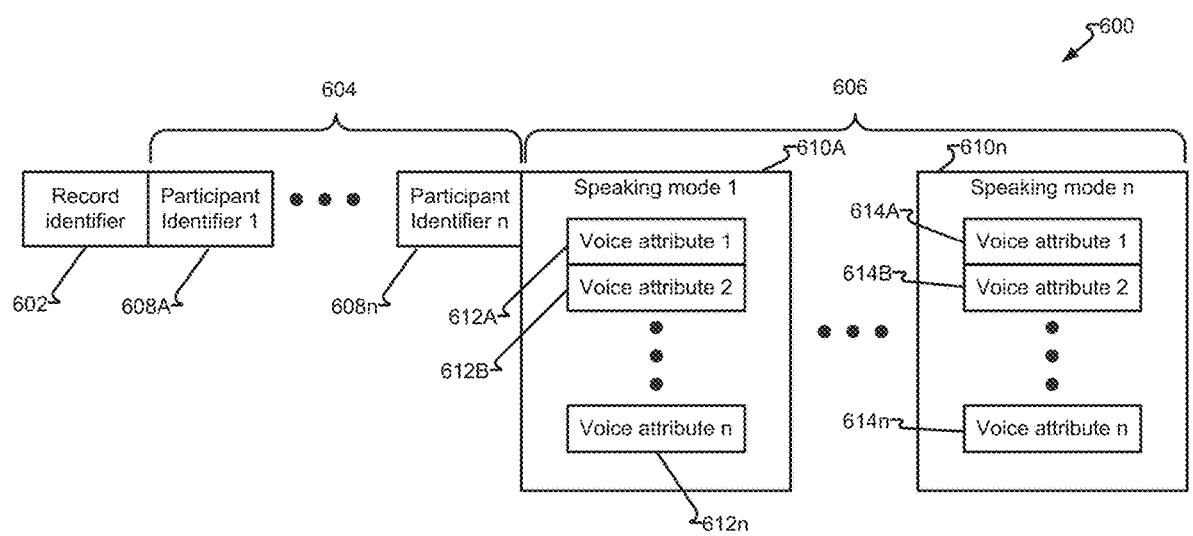
FIG. 6 depicts a data structure in accordance with embodiments of the present disclosure.

FIG. 6 depicts data structure 600 in accordance with embodiments of the present disclosure. Speech provided by humans, such as a particular participant 102 providing speech for inclusion in a conference content, versus speech provided to other, non-conference content, may be different in terms of speech attributes. For example, one speaking to a group of remote conference participants may have a particular manner of speaking that differs when speaking to a colleague or other party face-to-face. These manners may be quantified as various speech attributes and, utilized to determine whether speech provided by the participant is or is not intended for inclusion into the conference content. In one embodiment, data structure 600 illustrates fields for a number of records that may be utilized to maintain speech attributes for participants 102, such as may be maintained in data storage 112 for access by server 110.

In one embodiment, server 110 may receive non-speech sounds (e.g., street noise, barking dog, etc.) and determine the sound is to be excluded from the conference content and execute a muting action.

In another embodiment, data structure 600 comprises record identifier field 602, such as index, serial number, indicia of participant 102, indicia of endpoint 104, etc. In another embodiment, participant identifier block 604 comprises one or more participant identifier fields 608A-608n. Participant identifier fields 608A-608n may be utilized to maintain how a particular participant 102 is addressed. For example, participant identifier fields 608A-608n, may comprise a full name (e.g., "Robert Smith"), a first name (e.g., "Robert"), a shortened name (e.g., "Rob"), other form of address (e.g., "Bobby," "Bob," Robby," etc.), role (e.g., "Marketing," "Marketing department," "Marketing group," etc.), location (e.g., "East Coast office," "$6^{th}$ floor." etc.). As a result, another participant 102 that provides conference content may be determined to address a particular targeted participant 102. For example, "We will now hear from Robert Smith," "How are things in the East Coast Office," "Let's hear from the Marketing Group," "Bobbie, can you answer that," "Can someone from the $6^{th}$ floor answer that question," etc. And, in response, associate the content matching one or more of participant identifier fields 608A-608n and, if their associated endpoint 104 is muted, initiate an unmuting action.

In another embodiment, the sound comprises speech (e.g., comprehensible speech) and is determined to be extraneous to the conference upon determining a speech attribute differs, or differs beyond a previously determined threshold, from a prior speech attribute associated with the participant when providing speech intended for the conference. Speech provided by an individual participant 102 may be received during a prior event (e.g., a prior conference) or during a prior portion of a current event (e.g., a current conference). For example, participant 102B may have provided a prior portion of the conference content, such as to address an agenda item of a meeting, introduce themselves, ask questions, etc. The source of the sound provided to server 110 is readily identified by server 110 receiving data packets from the particular endpoint 104, which may further be registered to an associated participant 102. The sound waveforms of the prior speech provided may be quantified.

In one embodiment, sound quantification fields 606 may comprise a number of speaking mode data structures 610A-610n. For example, prior to a conference beginning, speech may be captured by a particular microphone 108 of an associated endpoint 104 and provided to server 110. As the conference has not yet began (e.g., waiting for a moderator or host to start the conference), such as speaking to a coworker nearby, and such speech may be quantified and added to a particular speaking mode data structure 610 associated with non-conference content. During the conference the particular participant 102 may provide a conference content, such as may be determined for speaking for greater than a threshold length of time (e.g., five seconds) as would be consistent with presenting a portion of the conference content. Accordingly, the speech may be quantified and added to a particular speaking mode data structure 610 associated with conference content. When speech is received from the particular participant 102 it may be evaluated against individual voice attributes 612A-612n and/or 614A-614n and, when matched, the encapsulating speaking mode data structure 610A-610n determines the particular speaking mode of the participant 102. For example, matching one or more voice attributes 612A-612n may then determine that the current speaking mode is that associated with speaking mode data structure 610A. If the associated speaking mode data structure 610 is associated with conference content, and the providing endpoint 104 is muted, an unmuting action may be performed. If the associated speaking mode data structure 610 is associated with non-conference content (e.g., speaking to a coworker face-to-face), and the providing endpoint 104 is not muted, a muting action may be performed.

Voice attributes 612A-612n . . . 614A-614n maintain speech (e.g., waveform) characterization or other indicia such as speaking volume, pitch, range, tone, or pace of speaking. As another option, the particular language spoken (e.g., English, German, etc.) may be identified by server 110 and maintain as an entry within a particular voice attributes 612A-612n . . . 614A-614n for the associated speaking mode data structure 610.

Figure 7:
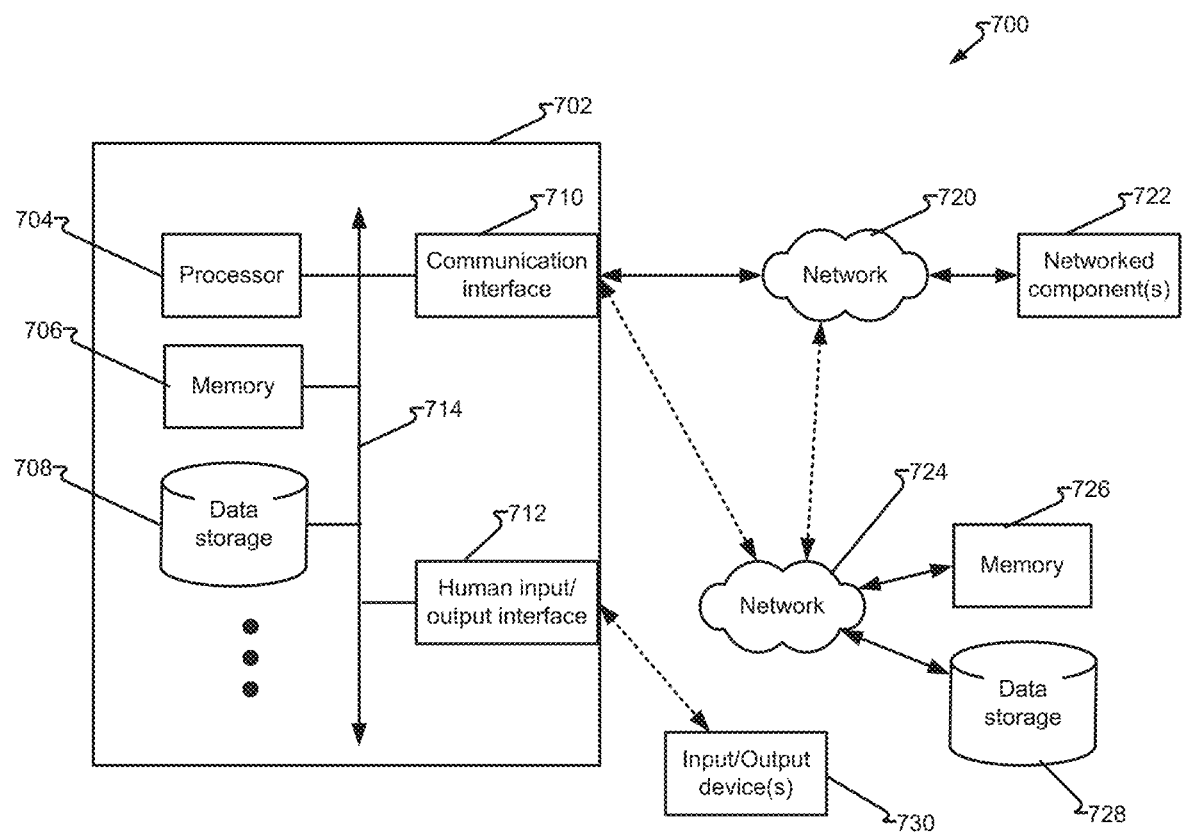
FIG. 7 depicts a second system in accordance with embodiments of the present disclosure.

FIG. 7 depicts system 700 in accordance with embodiments of the present disclosure. In one embodiment, endpoint 104 and/or server 110 may be embodied, in whole or in part, as device 702 comprising various components and connections to other components and/or systems. The components are variously embodied and may comprise processor 704. Processor 704 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via bus 714, executes instructions, and outputs data, again such as via bus 714. In other embodiments, processor 704 may comprise a shared processing device that may be utilized by other processes and/or process owners, such as in a processing array or distributed processing system (e.g., "cloud", farm, etc.). It should be appreciated that processor 704 is a non-transitory computing device (e.g., electronic machine comprising circuitry and connections to communicate with other components and devices). Processor 704 may operate a virtual processor, such as to process machine instructions not native to the processor (e.g., translate the Intel® 9xx chipset code to emulate a different processor's chipset or a non-native operating system, such as a VAX operating system on a Mac), however, such virtual processors are applications executed by the underlying processor (e.g., processor 704) and the hardware and other circuitry thereof.

In addition to the components of processor 704, device 702 may utilize memory 706 and/or data storage 708 for the storage of accessible data, such as instructions, values, etc. In one embodiment, data storage 112 is embodied, in whole or in part, as memory 706 and/or data storage 708. Communication interface 710 facilitates communication with components, such as processor 704 via bus 714 with components not accessible via bus 714. Communication interface 710 may be embodied as a network port, card, cable, or other configured hardware device. Additionally or alternatively, human input/output interface 712 connects to one or more interface components to receive and/or present information (e.g., instructions, data, values, etc.) to and/or from a human and/or electronic device. Examples of input/output devices 730 that may be connected to input/output interface include, but are not limited to, keyboard, mouse, trackball, printers, displays, sensor, switch, relay, etc. In another embodiment, communication interface 710 may comprise, or be comprised by, human input/output interface 712. Communication interface 710 may be configured to communicate directly with a networked component or utilize one or more networks, such as network 720 and/or network 724.

Network 106 may be embodied, in whole or in part, as network 720. Network 720 may be a wired network (e.g., Ethernet), wireless (e.g., WiFi, Bluetooth, cellular, etc.) network, or combination thereof and enable device 702 to communicate with network component(s) 722. In other embodiments, network 720 may be embodied, in whole or in part, as a telephony network (e.g., public switched telephone network (PSTN), private branch exchange (PBX), cellular telephony network, etc.)

Additionally or alternatively, one or more other networks may be utilized. For example, network 724 may represent a second network, which may facilitate communication with components utilized by device 702. For example, network 724 may be an internal network to a business entity or other organization, whereby components are trusted (or at least more so) that networked components 722, which may be connected to network 720 comprising a public network (e.g., Internet) that may not be as trusted.

Components attached to network 724 may include memory 726, data storage 728, input/output device(s) 730, and/or other components that may be accessible to processor 704. For example, memory 726 and/or data storage 728 may supplement or supplant memory 706 and/or data storage 708 entirely or for a particular task or purpose. For example, memory 726 and/or data storage 728 may be an external data repository (e.g., server farm, array, "cloud," etc.) and allow device 702, and/or other devices, to access data thereon. Similarly, input/output device(s) 730 may be accessed by processor 704 via human input/output interface 712 and/or via communication interface 710 either directly, via network 724, via network 720 alone (not shown), or via networks 724 and 720. Each of memory 706, data storage 708, memory 726, data storage 728 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 730 may be a router, switch, port, or other communication component such that a particular output of processor 704 enables (or disables) input/output device 730, which may be associated with network 720 and/or network 724, to allow (or disallow) communications between two or more nodes on network 720 and/or network 724. Ones of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A conference server, comprising:
    a network interface to a network;
    a storage component comprising a non-transitory storage device;
    a processor, comprising at least one microprocessor; and
    wherein the processor, upon accessing machine-executable instructions, cause the processor to perform:
        broadcasting conference content, via the network, to each of a plurality of endpoints and wherein the conference content comprises an audio portion received from a contributing endpoint of the plurality of endpoints;
        accessing audio profiles of a number of participants, each of the number of participants utilizing one of the plurality of endpoints, wherein each of the audio profiles characterizes speech;
        identifying a participant audio profile, from the audio profiles, that corresponds to a participant of the number of participants, upon detecting that the conference content comprises a spoken name and, following the spoken name, hearing conference content comprising speech from the participant;

determining whether the audio portion comprises human speech that is extraneous to the conference content comprising further determining whether the conference content comprises speech from the participant that matches the participant audio profile associated with extraneous speech; and upon determining that the audio portion comprises human speech that is extraneous to the conference content, executing a muting action to exclude the audio portion from the conference content.

2. The conference server of claim 1, wherein the processor performs executing the muting action, further comprising, signaling the contributing endpoint to cause the contributing endpoint to energize a muting prompt circuit.

3. The conference server of claim 1, wherein:
the participant audio profile of the participant comprises at least one of speaking volume, pitch, range, tone, or pace of speaking; and
wherein determining whether the audio portion is extraneous to the conference content, further comprises, determining that at least one of speaking volume, pitch, range, tone, or pace of speaking of the audio portion differs from the at least one of speaking volume, pitch, range, tone, or pace of speaking of the participant audio profile.

4. The conference server of claim 3, wherein the processor determines that the audio portion comprises human speech that is extraneous to the conference content upon determining that the at least one of speaking volume, pitch, range, tone, or pace of speaking of the audio portion differs from the at least one of speaking volume, pitch, range, tone, or pace of speaking of the audio profile and that the difference is greater than a previously determined threshold.

5. The conference server of claim 1, wherein the participant audio profile comprises at least one of speaking volume, pitch, range, tone, or pace of speaking as sampled from the conference content that follows the participant being addressed by name by another participant associated with a different one of the plurality of endpoints.

6. The conference server of claim 1, wherein the participant audio profile of the participant characterizes speech provided by the participant with regard to a sound attribute comprising a first spoken language; and
wherein determining whether the audio portion comprises human speech that is extraneous to the conference content, further comprises, determining if the audio portion comprises a second spoken language.

7. The conference server of claim 1, wherein the processor further performs, causing each of the plurality of endpoints to present indicia of the muting action associated with the contributing endpoint.

8. A conference server, comprising:
a network interface to a network;
a storage component comprising a non-transitory storage device;
a processor, comprising at least one microprocessor; and
wherein the processor, upon accessing machine-executable instructions, cause the processor to perform:
broadcasting conference content, via the network, to each of a plurality of endpoints and wherein the conference content selectively comprises an audio portion received from a contributing endpoint of the plurality of endpoints;

accessing an audio profile of a number of participants each utilizing one of the plurality of endpoints, wherein each of the audio profiles characterizes speech;

identifying an audio profile of a participant, from the audio profiles, that corresponds to the participant upon detecting the conference content comprises a spoken name and, following the spoken name, hearing conference content comprising speech from the participant;

determining whether the audio portion is muted, wherein the processor receives the audio portion from the contributing endpoint and omits the audio portion from the conference content comprising further determining whether the conference content comprises speech from the participant that matches the participant's audio profile associated with extraneous speech;

upon determining that the audio portion is muted, determining whether the contributing endpoint is erroneously muted and wherein the audio portion comprises encoded sound and wherein the processor determines that the contributing endpoint is erroneously muted further comprising, determining that the encoded sound comprises human speech from the participant that matches the participant's audio profile associated with non-extraneous speech; and when erroneously muted, executing an unmuting action to include the audio portion in the conference content.

9. The conference server of claim 8, wherein the processor performs executing the unmuting action, further comprising, signaling the contributing endpoint to cause the contributing endpoint to energize an unmuting prompt circuit.

10. The conference server of claim 8, wherein the processor performs the determination that the contributing endpoint is erroneously muted, further comprising:
upon determining the encoded sound comprises speech, accessing the audio profile of the participant, wherein in the audio profile characterizes speech provided by the participant while contributing speech to the conference content;
determining whether the audio portion comprises human speech that is extraneous to the conference content, further comprising, determining whether at least one of speaking volume, pitch, range, tone, or pace of speaking of the audio portion differs from the at least one of speaking volume, pitch, range, tone, or pace of speaking of the audio profile; and
when the audio portion comprises human speech that is determined not to be extraneous, performing the unmuting action.

11. The conference server of claim 8, wherein the processor performs the determination that the contributing endpoint is erroneously muted, further comprising, upon determining the encoded sound comprises speech that follows the participant being addressed by name by another participant associated with a different one of the plurality of endpoints.

12. A method for correcting an erroneous audio setting, comprising:
broadcasting conference content, via a network, to each of a plurality of endpoints, wherein the conference content comprises audio content provided by one or more of the plurality of endpoints;

accessing audio profiles of a number of participants each utilizing one of the plurality of endpoints, wherein each of the audio profiles characterizes speech;

identifying an audio profile of a participant, from a plurality of audio profiles, that corresponds to the participant upon detecting that the conference content comprises a spoken name and, following the spoken name, hearing conference content comprising speech from the participant;

determining whether a first audio portion, of the audio content and comprising human speech that, received from a first endpoint of the plurality of endpoints is extraneous to the conference content comprising further determining whether the conference content comprises speech from the participant that matches the participant's audio profile associated with extraneous speech; and upon determining that the first audio portion comprises human speech that is extraneous to the conference content, executing a muting action to exclude the first audio portion from the conference content.

13. The method of claim 12, wherein the muting action, further comprising, signaling the first endpoint to cause the first endpoint to energize a muting prompt circuit.

14. The method of claim 12, wherein:

the participant audio profile of the participant characterizes speech provided by the participant while contributing speech to the conference content and further comprising:

accessing the participant audio profile of the participant comprising at least one of speaking volume, pitch, range, tone, or pace of speaking; and determining whether the first audio portion comprises human speech that is extraneous to the conference content, further comprising, determining that the at least one of speaking volume, pitch, range, tone, or pace of speaking of the first audio portion differs from the at least one of speaking volume, pitch, range, tone, or pace of speaking of the participant audio profile and wherein the difference is greater than a previously determined threshold.

15. The method of claim 12, further comprising:

receiving a second audio portion from a second endpoint of the plurality of endpoints that is muted and, when muted, omitted from the conference content;

determining whether the second endpoint is erroneously muted; and upon determining that the second endpoint is erroneously muted, executing an unmuting action to include the second audio portion in the conference content.

16. The method of claim 15, wherein executing the unmuting action, further comprising, signaling the first endpoint to cause the first endpoint to energize an unmuting prompt circuit.

17. The method of claim 15, wherein the determining whether the second audio portion is erroneously muted, further comprises, upon determining that the audio portion comprises encoded sound further comprising speech that follows the participant being addressed by name by another participant associated with a different one of the plurality of endpoints.

18. The conference server of claim 1, wherein the processor further performs:

determining whether the audio portion is muted, wherein the processor receives the audio portion from the contributing endpoint and omits the audio portion from the conference content;

upon determining that the audio portion is muted, determining whether the contributing endpoint is erroneously muted and wherein the audio portion comprises encoded sound and wherein the processor determines the contributing endpoint is erroneously muted further comprising, determining the encoded sound comprises human speech; and when erroneously muted, executing an unmuting action to include the audio portion in the conference content.

* * * * *